US011952830B2

(12) United States Patent
Dussault

(10) Patent No.: US 11,952,830 B2
(45) Date of Patent: Apr. 9, 2024

(54) THRESHOLD SYSTEM WITH AN INSULATED THERMAL BREAK DEVICE AND RELATED METHODS

(71) Applicant: Griffin Dussault, Alstead, NH (US)

(72) Inventor: Griffin Dussault, Alstead, NH (US)

( * ) Notice: Subject to any disclaimer, the term of this patent is extended or adjusted under 35 U.S.C. 154(b) by 0 days.

(21) Appl. No.: 18/128,043

(22) Filed: Mar. 29, 2023

(65) Prior Publication Data

US 2023/0313598 A1 Oct. 5, 2023

Related U.S. Application Data

(63) Continuation of application No. 17/707,825, filed on Mar. 29, 2022, now Pat. No. 11,639,626.

(51) Int. Cl.
*E06B 1/70* (2006.01)
*E06B 1/52* (2006.01)

(52) U.S. Cl.
CPC ................ *E06B 1/70* (2013.01); *E06B 1/522* (2013.01); *E06B 2001/707* (2013.01)

(58) Field of Classification Search
CPC ...... E06B 1/522; E06B 1/70; E06B 2001/707; E06B 3/485; E02D 27/00; E04G 21/1841
USPC ............................................................ 49/467
See application file for complete search history.

(56) References Cited

U.S. PATENT DOCUMENTS 1,873,143 A 8/1932 Olson et al.
2,933,782 A 4/1960 Cornell
3,382,617 A 5/1968 St. Aubin
3,591,985 A 7/1971 Coppins
3,667,164 A 6/1972 Coppins
3,774,343 A 11/1973 Cribben et al.
3,990,187 A 11/1976 Brown et al.
4,309,855 A 1/1982 Pate et al.
4,310,991 A 1/1982 Seely
4,411,104 A 10/1983 St. Aubin
4,513,536 A 4/1985 Giguere
4,704,048 A 11/1987 Ahlgrimm
4,784,516 A 11/1988 Cox
5,056,281 A 10/1991 McCarthy
5,136,814 A 8/1992 Headrick
5,269,624 A 12/1993 Kramer
5,615,525 A 4/1997 Kentworthy
5,655,349 A 8/1997 Ghali et al.
5,704,172 A 1/1998 Gougeon et al.
5,979,131 A 11/1999 Remmele et al.
5,992,123 A 11/1999 Kies
6,039,503 A 3/2000 Cathey
6,052,949 A 4/2000 Procton et al.
6,061,967 A * 5/2000 Judds ........................ E06B 1/70 49/304

(Continued)

FOREIGN PATENT DOCUMENTS

CA 2995261 A1 8/2019

OTHER PUBLICATIONS

Website: New Hampshire Department of Safety, https://www.nh.gov/safety/boardsandcommissions/bldgcode/, Accessed Mar. 29, 2022, 1 pp.

*Primary Examiner* — James M Ference
(74) *Attorney, Agent, or Firm* — Offit Kurman, P.A.; Gregory A. Grissett

(57) ABSTRACT

A threshold system with an insulated thermal break device configured to provide a thermal break for insulating a door opening and related methods is provided.

23 Claims, 6 Drawing Sheets

(56) References Cited

U.S. PATENT DOCUMENTS

| | | | |
|---|---|---|---|
| 6,308,470 | B1 | 10/2001 | Durkovic |
| 6,491,468 | B1 | 12/2002 | Hagen |
| 6,792,728 | B2 | 9/2004 | Toulemonde et al. |
| 7,437,855 | B2 | 10/2008 | Locke et al. |
| 8,522,504 | B2 | 9/2013 | Ghali et al. |
| 8,887,455 | B2 | 11/2014 | Kreyling |
| 8,950,154 | B1 | 2/2015 | Casey |
| 8,973,317 | B2 | 3/2015 | Larkin |
| 9,016,027 | B1 | 4/2015 | Kreizinger |
| 9,388,626 | B2 | 7/2016 | Gilbert et al. |
| 9,598,891 | B2 | 3/2017 | Knoblauch et al. |
| 9,816,310 | B2 | 11/2017 | Haynes |
| 9,863,137 | B2 | 1/2018 | Knoblauch et al. |
| 9,885,210 | B2 | 2/2018 | Haynes |
| 9,903,149 | B2 | 2/2018 | Knoblauch et al. |
| 10,787,809 | B2 | 9/2020 | Knoblauch et al. |
| 10,822,862 | B2 | 11/2020 | Header |
| 11,047,165 | B1 | 6/2021 | Monts De Oca |
| 11,639,626 | B1 * | 5/2023 | Dussault ................. E02D 27/00 49/467 |
| 2006/0005470 | A1 | 1/2006 | Mullen et al. |
| 2008/0160203 | A1 | 7/2008 | O'Leary et al. |
| 2010/0064590 | A1 | 3/2010 | Jones et al. |
| 2010/0095620 | A1 | 4/2010 | Wilkes, Jr. |
| 2014/0182221 | A1 | 7/2014 | Hicks |
| 2014/0331581 | A1 | 11/2014 | Larkin |
| 2016/0032554 | A1 | 2/2016 | Hicks |
| 2016/0281413 | A1 | 9/2016 | Knoblauch et al. |
| 2017/0022682 | A1 | 1/2017 | Hicks |
| 2017/0067245 | A1 | 3/2017 | Knoblauch et al. |
| 2019/0234067 | A1 | 8/2019 | Knoblauch et al. |
| 2021/0172240 | A1 * | 6/2021 | Kirschner ............... E02D 31/00 |
| 2022/0243523 | A1 * | 8/2022 | Kendall .................... E06B 1/70 |
| 2023/0313598 | A1 * | 10/2023 | Dussault ............. E04G 21/1841 49/467 |

* cited by examiner

THRESHOLD SYSTEM WITH AN INSULATED THERMAL BREAK DEVICE AND RELATED METHODS

CROSS-REFERENCE TO RELATED APPLICATIONS

The present application claims the benefit of priority to and is a continuation of U.S. application Ser. No. 17/707,825, filed Mar. 29, 2022, the entire contents of which are incorporated by reference into the present application.

TECHNICAL FIELD

The present disclosure relates generally to a threshold system with an insulated thermal break device for a door threshold in a building structure, in particular for a garage door, and related methods of installation.

BACKGROUND

One of the first steps in building a residential or commercial structure is constructing a foundation. When it comes to residential or commercial structures, they are often built on a concrete slab foundation because of the ease of construction. However, in colder climates, a non-insulated concrete slab foundation results in cold floors and higher heating costs as heat is lost from an interior of a building to an exterior of a building. As concrete has a relatively high thermal conductance, concrete slab foundations lose energy primarily due to heat conducted outward and through the perimeter of the concrete slab foundation.

Typically, garages with heated floors are often built with hydronic radiant tubing that is often difficult to effectively insulate according to building regulations, thereby contributing to heat loss. In addition, a concrete floor within a garage door opening provides a conductive route for facilitating transfer of heat from the interior of a building to the outside.

Conventional insulation mechanisms are ineffective in especially harsh climates. For example, insulated garage doors alone can help reduce heat loss from an interior of a building. However, even then, the concrete floor extending through the garage door opening remains a conductive route for heat transfer. As a result, there remain increased energy costs associated with heating and unnecessary heat loss during colder seasons.

Thus, there is still a need for an insulated door threshold system capable of being installed that addresses the aforementioned problems of heat loss due to the movement of heat from the interior to the exterior of a building.

SUMMARY

The present disclosure is an insulated garage door threshold for use in a garage of a building or a home. The device provides a thermal break to prevent movement of heat from an interior to an exterior of a building. More specifically, the device can provide a thermal break between heated garage floors and an exterior in colder climates.

An embodiment of the present disclosure includes a garage door threshold system. The garage door threshold system includes a thermal break device and an insulation member. The thermal break device includes an elongated sill member and an elongated base member. The elongated sill member includes a leading end, a trailing end opposite the leading end along a longitudinal direction, opposed side ends spaced apart along a transverse direction that is perpendicular to the longitudinal direction, a bottom surface, and an upper surface opposite the bottom surface. The elongated base member extends from the elongated sill member in a vertical direction that is perpendicular to the longitudinal direction and the transverse direction. The elongated base member further includes an inner surface and an outer surface opposite the inner surface. The insulation member is configured to be positioned adjacent to at least one of the bottom surface of the elongated sill member and the inner surface of the elongated base member, such that, the thermal break device and the insulation member are configured to provide a thermal break between an interior of a building structure and an exterior of a building structure when installed at a door opening.

Another embodiment of the disclosure is a thermal break device for a door opening of a building structure and configured to provide a thermal break between an interior of the building structure and an exterior of the building structure. The thermal break device includes an elongated sill member and an elongated base member. The elongated sill member includes a leading end, a trailing end opposite the leading end along a longitudinal direction, opposed side ends spaced apart along a transverse direction that is perpendicular to the longitudinal direction, a bottom surface, and an upper surface opposite the bottom surface. The elongated base member extends from the elongated sill member in a vertical direction that is perpendicular to the longitudinal direction and the transverse direction. The elongated base member further includes an inner surface, an outer surface spaced apart the inner surface along the longitudinal direction, and a lower terminal end spaced apart from the upper surface of the elongated sill member along the vertical direction. The bottom surface of the elongated sill member and the elongated base member form a receiving pocket sized to receive insulation therein.

Another embodiment of the disclosure is a method including installing insulation material in an opening in concrete aligned with a door opening. The method further includes placing a thermal break device into the opening so that an elongated sill of the thermal break device is aligned with an exterior surface near or adjacent to the door opening. The method further includes securing the thermal break device in place in the opening and pouring concrete into the opening to secure the thermal break device in alignment with the door opening.

Another embodiment of the disclosure is a method of installing a threshold system for insulating a door opening. The method includes cutting a thermal break device to a length of the door opening. The method further includes installing insulation material in an opening in concrete aligned with the door opening. The method further includes securing a thermal break device to a board adjacent a second insulation material so that an elongated sill of the thermal break device is aligned with an exterior surface adjacent the door opening. The method further includes pouring concrete into the opening to fix the thermal break device in alignment with the door opening.

BRIEF DESCRIPTION OF THE DRAWINGS

The foregoing summary, as well as the following detailed description of exemplary embodiments of the present application, are better understood when read in conjunction with the appended drawings. For the purposes of illustrating the present application, there is shown in the drawings, exemplary embodiments of the disclosure. It should be understood, however, that the application is not limited to the precise arrangements and instrumentalities shown. In the drawings.

DETAILED DESCRIPTION OF ILLUSTRATIVE EMBODIMENTS

Figure 1:
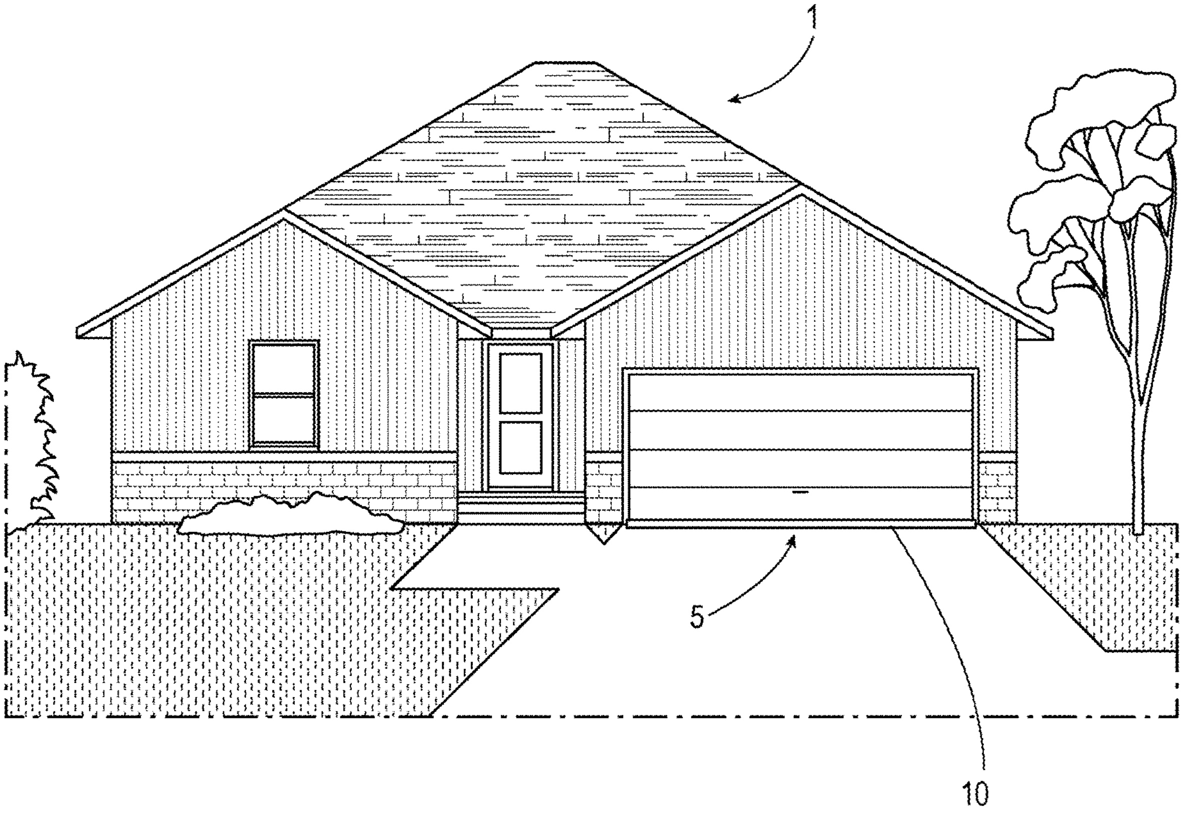
FIG. 1 is a schematic elevation view of a building structure with a threshold system installed in accordance with an exemplary embodiment of the present disclosure.

Referring to FIG. 1, a door threshold system 10 as described is configured to provide a thermal break to insulate door openings 5, such as a garage door opening (e.g., overhead or roll-up) of a building 1. The door openings are typically garage doors, as shown. While the embodiments described in the present disclosure are configured for garage door openings, the embodiments are also configured for insulating thresholds of door openings of any size, such as entryway doors, e.g., front doors, back doors, etc. The threshold systems are configured for aiding insulation of conventional door openings of a residential or commercial building or other door openings in a multi-use building. The door threshold system can be used with new construction associated with a residential or commercial structure.

Continuing with FIG. 1, the door threshold system 10 as described herein is configured to minimize the transfer and/or loss of heat from an interior of a building structure to an exterior of a building structure. More specifically, the door threshold system 10 minimizes the transfer of heat from an interior of a building 1 through the concrete slab near the opening 5 of said building 1. Throughout the present disclosure, the designation "interior" refers to the interior environment of a building structure and "exterior" refers to the exterior environment.

Figure 2:
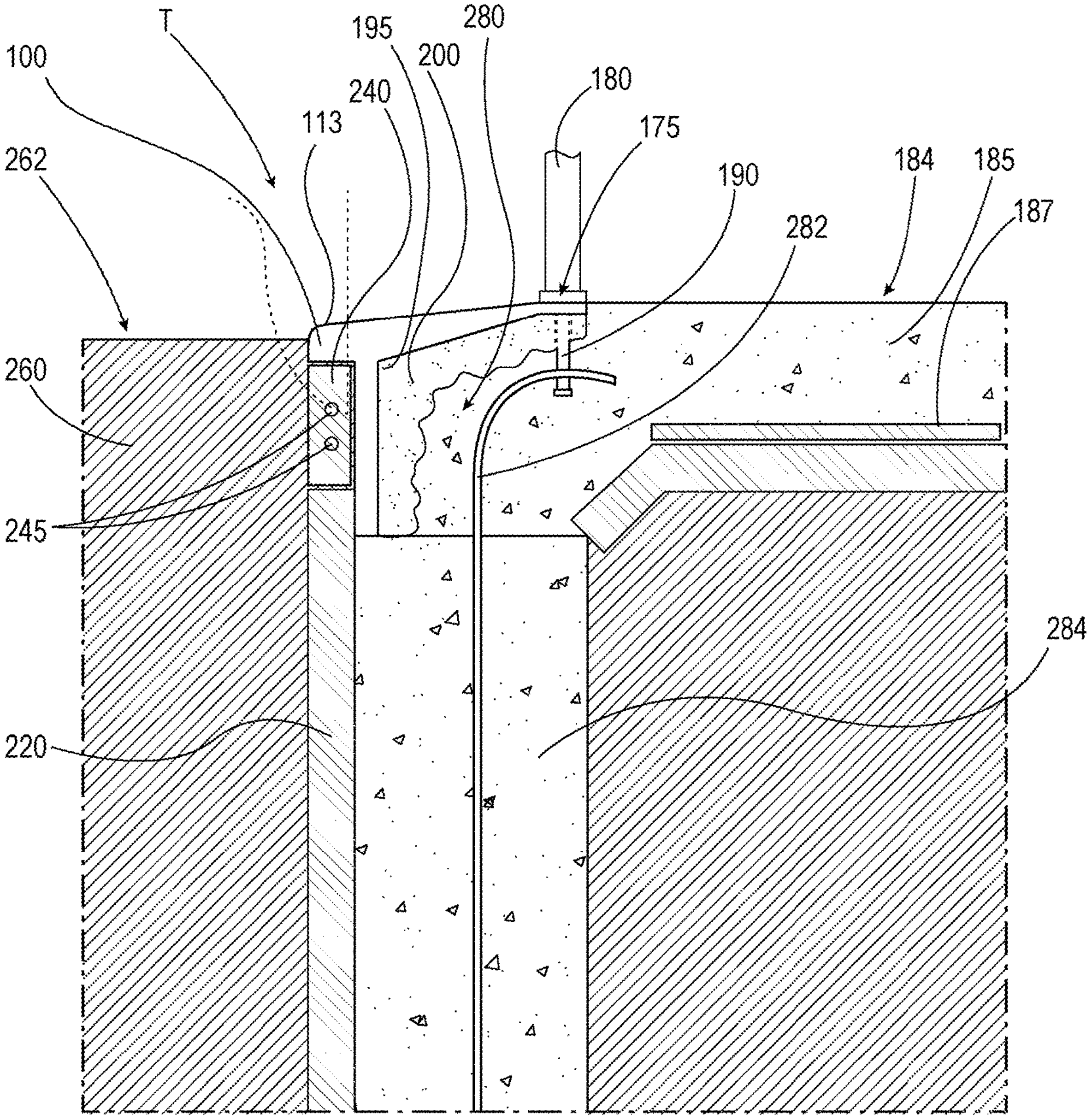
FIG. 2 is a partial side view of the threshold system of FIG. 1 in a partially assembled position with certain parts shown in cross-section for illustrative purposes.

In addition, the door threshold system 10 is better equipped to comply with state, regional, and national building codes specific to buildings with heated floors used in cold weather climates. For example, builders and contractors in different geographic regions must follow specific guidelines and building codes regarding insulation and energy savings that are aligned with model codes such as the International Energy Conservation Code ("IECC"). Other standards that govern construction of building structures include the International Building Code ("IBC"), International Existing Building Code ("IEBC"), International Plumbing Code ("IPC"), International Mechanical Code ("IMC") and the International Residential Code ("IRC"). As a result, building codes require that any construction be compliant with energy code requirements based on, for example, the IECC. Therefore, builders and contractors must meet or exceed an identified insulation R-value in order to comply with building codes. The door threshold system is intended to help ensure that builders and contractors meet and/or exceed energy requirements required by building codes in each jurisdiction. In many cases, especially, where radiant heating is installed in the foundation or slabs, during construction, a contractor may leave openings in the foundations proximate the door opening 5 (FIG. 2). The door threshold systems 10 as described herein are configured to be placed at or within those preformed openings to aid in minimizing thermal loss. The aforementioned standards are intended to minimize heat loss and therefore improve energy efficiency of such building structures. But the location of the slab opening mentioned above, in absence of using the threshold system 10 as described herein, are a widely acknowledged source of heat loss. Because the threshold systems 10 can minimize thermal break, the inventive concepts here help contractors and building owners better comply with applicable building codes and standards discussed above.

Referring to FIGS. 1-5, an exemplary door threshold system 10 includes a thermal break device 100 and an insulation member 200, that when installed together, is configured to provide a thermal break between an interior and exterior of the building.

Referring now to FIGS. 2-5, the thermal break device 100 is configured to provide a thermal break T (FIG. 2) between an interior and an exterior of a building 1 (FIG. 1). The building 1 includes an interior floor 185, which may include radiant tubing 187 and a concrete slab, or foundation 284. As shown in FIG. 2, the foundation 284 is a concrete slab. The slab 284 may include other devices to enhance strength, such as reinforcement bars 282. Wire mesh and/or additional steel reinforcing bars may be implanted in the concrete slab for additional structural integrity. This is especially true in colder climates, where the concrete foundation must extend deep enough into the ground to remain below a frost line. The threshold system 10 as used herein is configured to bridge the gap and thermal break T between an upper surface of the slab 284 and forward surface of the floor 185, as illustrated in FIG. 2. In particular, the threshold system 10 is designed to provide a thermal break for interior floors with radiant tubing 187 that often suffer from heat loss through slab 284. Other components of the system 10 are included in this application, as described further below, to aid in achieving the desired insulative objectives.

Figure 3:
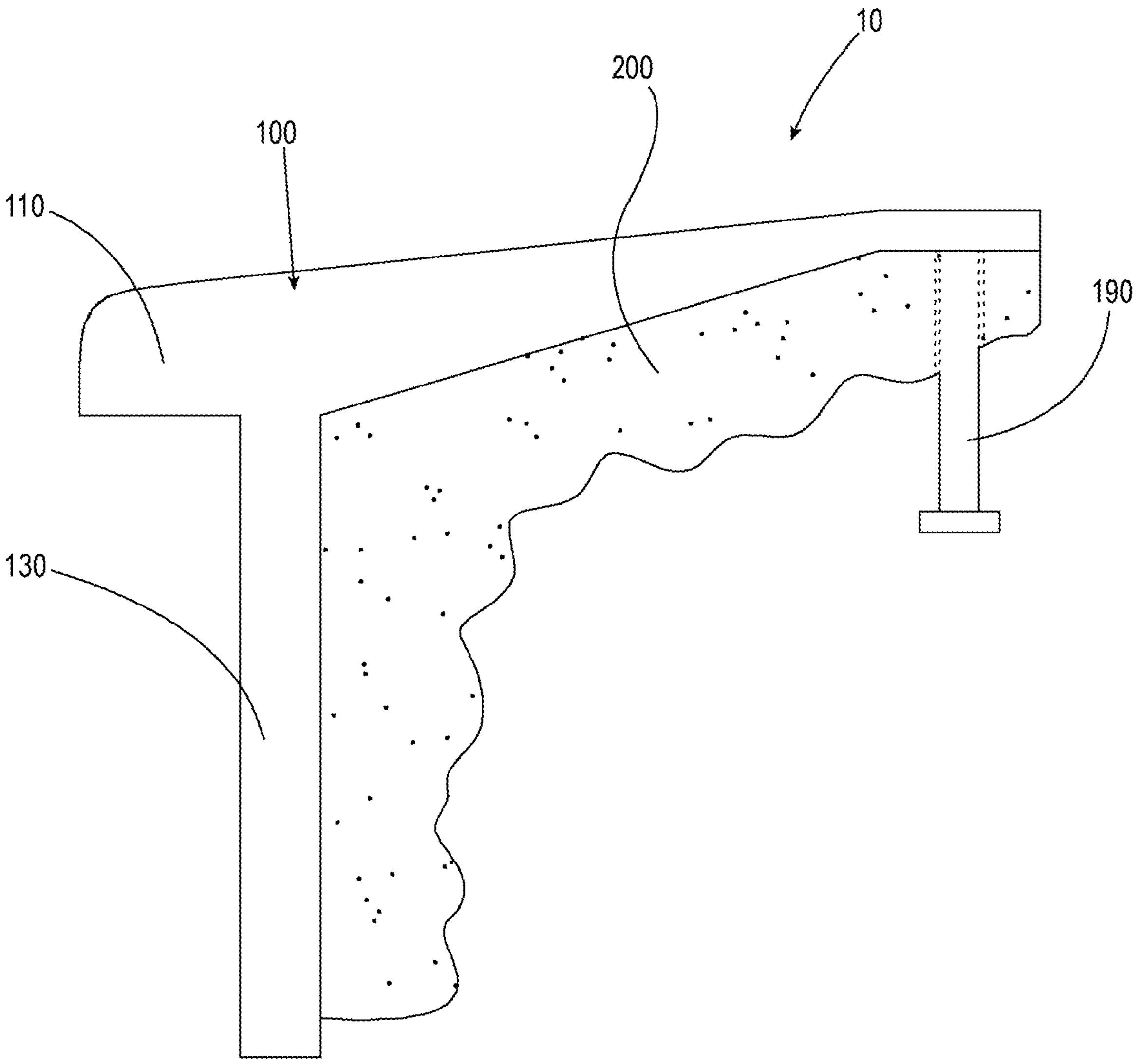
FIG. 3 is a partial side perspective view of the threshold system of FIG. 1 with certain parts shown in cross-section for illustrative purposes.
Figure 4:
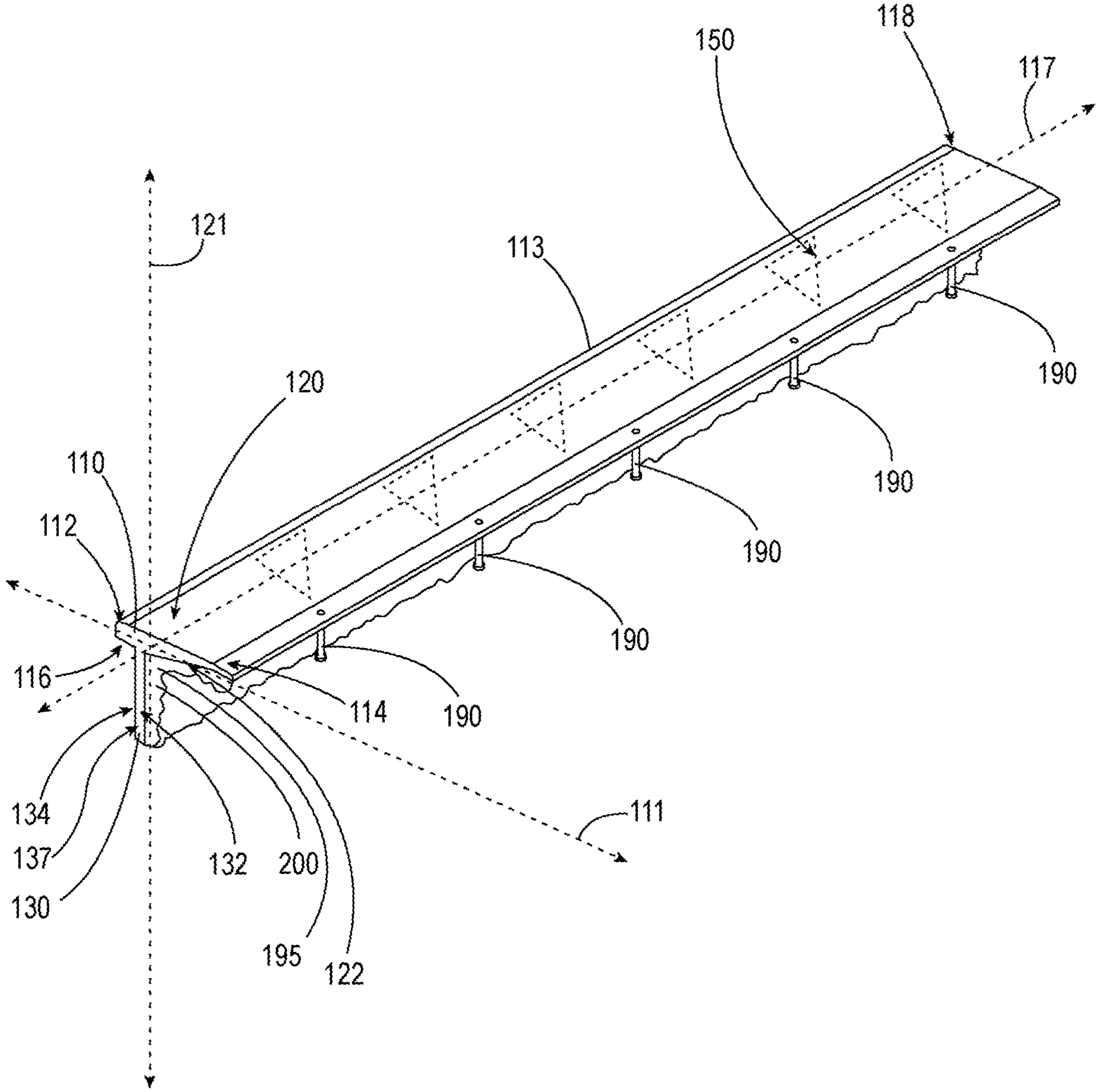
FIG. 4 is a rear perspective view of the threshold system of FIG. 1.

Continuing with FIGS. 2-5, the thermal break device 100 includes an elongated sill member 110 and an elongated base member 130 that extends from the elongated sill member 110 generally downwardly in a vertical direction 121 (FIG. 4). As shown in FIG. 4, the elongated sill member 110 includes an upper surface 120, a bottom surface 122, a leading end 112, and a trailing end 114 opposite the leading end 112, and opposed side ends 116, 118. The upper surface 120 and bottom surface 122 are opposed to each other along a vertical direction 121, and the leading end 112 and trailing end 114 are opposed to each other along a longitudinal direction 111 that is perpendicular to and intersects the vertical direction 121. The upper surface 120 can be considered the exposed surface and contacts the bottom edge of the door when the door is closed. The opposed side ends 116, 118 are spaced apart with respect to each other along a transverse direction 117 that is perpendicular to and intersects the vertical direction 121 and the longitudinal direction 111. The length of the thermal break device 100 extends from side end 116 to side end 118 along the transverse direction 117. As such, it is to be understood that the length of the thermal break device 100 is somewhat related to and may be at least coextensive with the width of the door opening 5. In this disclosure, an interior direction P is generally a direction from the leading end 112 toward the trailing end 114 and exterior direction D is a direction generally from the trailing end 114 toward the leading end 112.

As shown in FIG. 2, when thermal break device 100 is installed across a garage door threshold opening, the upper surface 120 of the elongated sill member 110 partially engages a bottom surface 175 of a garage door 180 when the garage door is in a closed position. As a result of the upper surface 120 engaging the bottom surface 175, a substantial seal is formed between the garage door 180 and the elongated sill member 110. This seal, in turn, can limit or restrict movement of air flow under the garage door 180 when the garage door is in the closed position.

Continuing with FIG. 2, a seal member (not shown) can be fastened to the upper surface 120 of the elongated sill member 110 and/or to the bottom surface 175 of the garage door 180. In a typical embodiment, the seal member can be fastened to the upper surface 120 or bottom surface 175 via a plurality of fasteners or an adhesive. It should be appreciated that the seal member may be manufactured in a variety of lengths and widths to accommodate a wide variety of garage door openings. Where necessary, the seal member may be trimmed using a saw, shears or other cutting means to accommodate the specific dimensions of the garage door opening. Specific dimensions are intended to help the reader understand the scale and advantage of the present disclosure. However, the dimensions of the exemplary embodiments are not limited to the recited dimensions.

Figure 5:
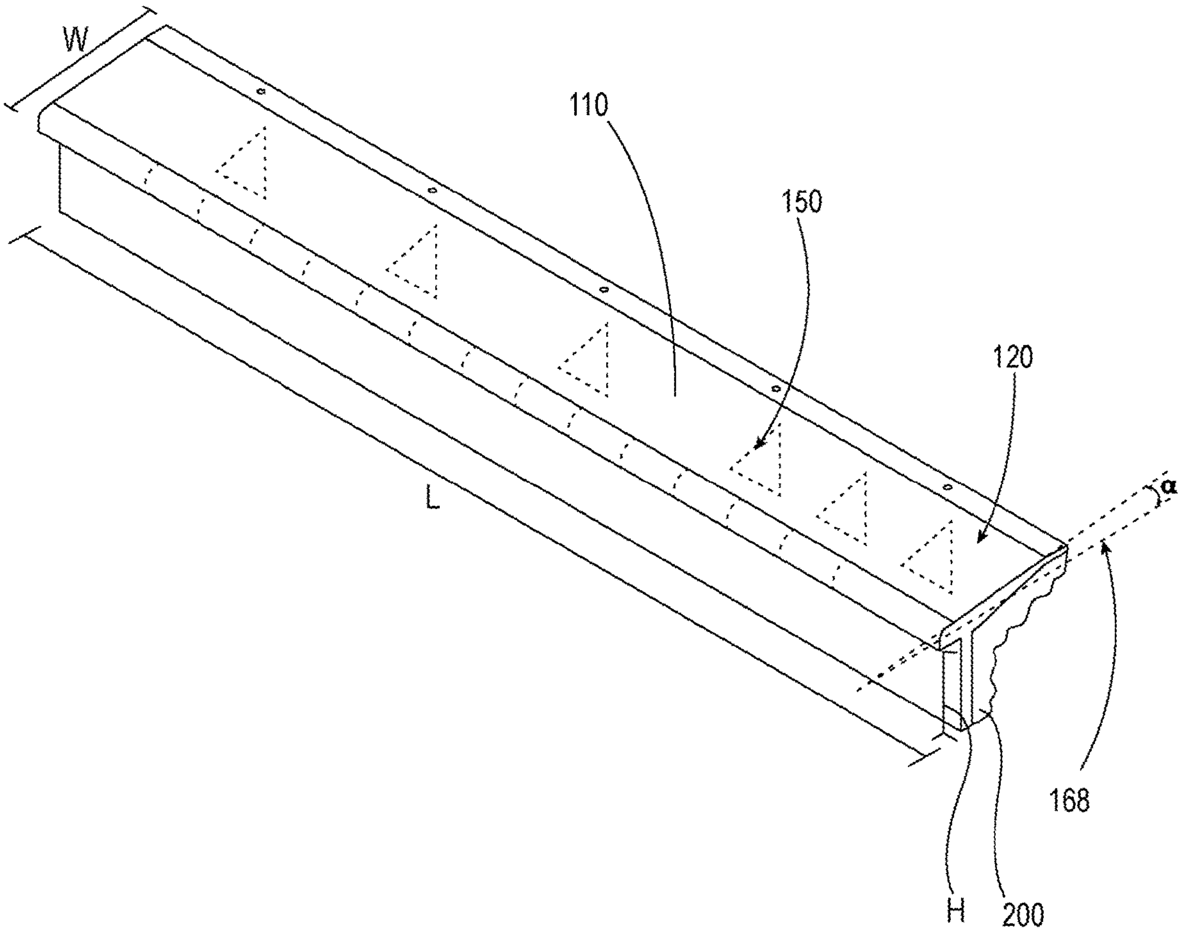
FIG. 5 is a front perspective view of the threshold system of FIG. 4.

Referring now to FIGS. 4 and 5, the upper surface 120 of the elongated sill member 110 may be configured to facilitate fluid transfer and/or gradual transition to the driveway surface from the floor of the structure. In one example, as shown, the upper surface 120 slopes upwardly from the leading end 112 to the trailing end 114. As illustrated in FIG. 5, upper surface 120 and a horizontally extending axis 168 of the elongated sill member 110 define an angle $\alpha$ of about approximately between about 5 degrees and about 15 degrees. In one example, angle $\alpha$ is about 9 degrees. It should be appreciated that angle $\alpha$ can alternatively be less than or greater than range of degrees disclosed above to accommodate the specific dimensions of the construction area where the thermal break device is being installed. Alternatively expressed, the upper surface 120 of the elongated sill member 110 could slope downwardly from the trailing end 114 toward the leading end 112. The downward slope promotes positive drainage of any fluid that may contact the upper surface 120 of the elongated sill member 110. As such, the slope of the upper surface 120 can be used to direct fluid away from the thermal break device 100 and the door opening.

It should be appreciated that the slope and the sealing member discussed above generally serve to restrict unwanted air and water leaks into an interior of a building. That is, the slope facilitates proper drainage of moisture and water associated with adverse weather or the melting of snow. Any runoff or debris moves in an exterior direction from the trailing end 114 to the leading end 112. As set forth in the present disclosure, the term drainage typically refers to movement of water. However, it is to be appreciated that drainage may refer to movement of any fluid, including any debris that may be entrapped within the fluid.

Continuing with FIGS. 2 and 4, the leading end 112 of the elongated sill member 110 includes a lip 113. The lip 113 extends outwardly from a location where the elongated sill member 110 and the elongated base member 130 connect. The lip 113 may be substantially coplanar with an upper surface 262 of a driveway 260 (FIG. 2) when the threshold system 10 is fully installed at a thermal break T at the opening 5. Similarly, the upper surface 120 of the elongated sill member 110 at the trailing end 114 of the elongated sill member 110 may be substantially coplanar with an upper surface 184 of the floor in the building. Such orientation facilitates movement of vehicles and other objects from an exterior of a building to an interior of the building, and vice versa. The substantially coplanar relationship also allows for a more effective seal to be formed when the garage door is in a closed position. As a result, there is a reduction in heat loss, particularly noticeable in colder climates.

Referring now to FIGS. 4 and 5, the upper surface 120 of the elongated sill member 110 includes one or more anti-slip elements 150. The anti-slip elements include, but are not limited to, teeth, ridges, friction increasing elements, patterned divots, keels or gripping or purchasing projections. In addition, the anti-slip elements can define a plurality of grooves spaced from and parallel to one another and extending longitudinally along the elongated sill member 110. The grooves can facilitate collecting and directing fluid, which helps with traction between a vehicle and the anti-slip elements 150. In another example, the anti-slip elements may be a roughened surface or comprise an adhesive trap along the upper surface 120 of the elongated sill member 110 to provide the anti-slip feature. In yet another example, the anti-slip elements can be embossed with a customized image or shape such as squares, rectangles, triangles, circles, ovals, or any other shape or design desired by a customer. For example, the anti-slip elements 150 can be an embossed logo of a manufacturer or producer of the garage door threshold system.

As shown in FIG. 4, the elongated base member 130 includes an inner surface 132 and an outer surface 134 opposite the inner surface 132. As shown, the inner surface 132 and outer surface 134 are opposed to each other along the longitudinal direction 111. Furthermore, the elongated base member 130 extends from the elongated sill member 110 along the vertical direction 121 that is perpendicular to the longitudinal direction 111 and the transverse direction 117. As shown, the elongated base member 130 defines a lower terminal end 137 spaced apart from the upper surface 120 of the elongated sill member 110 along the vertical direction 121.

The elongated sill member 110 and elongated base member 130 are designed to engage the driveway surface and slab but also provide an insulative "pocket" 195 to receive the insulation member 200. In other words, the bottom surface 122 of the elongated sill member 110 and the elongated base member 130 form receiving pocket 195 sized to receive the insulation member 200 therein. As shown, the elongated sill member 110 and elongated base member 130 form a generally L-shaped body. As shown in FIG. 5, the elongated sill member 110 has a length L between about 8 inches and about 10 inches and a width W between about 1 inch and about 3 inches. In one example, the length L of the elongated sill member is about 9 inches and the width W is about 2 inches. The elongated base member 130 has a length corresponding to the length L of the elongated sill member and a height H between about 7 inches and about 9 inches. In one example, the length of the elongated base member is about 9 inches and the height H is about 8 inches. The relationship between the overall length/width of the elongated sill member 110 relative to the height of the elongated base member 130 may be selected to create a sizable enough pocket 195 to receive sufficient insulation material, as described above. While dimensions are expressed here, these are not limiting as the components of the thermal break device 100 can be manufactured a number of different ways and cut to the length, on-site, as needed. As shown in FIGS. 2-5, the elongated sill member 110 and elongated base member 130 are of unitary construction. However, it is to be appreciated that the thermal break device 100 can be modularly constructed such that the elongated sill member 110 and elongated base member 130 are removably attached to one another.

The thermal break device 100 can be formed from a super high density polyethylene plastic or any composite material suitable for its intended purpose. It is to be understood that the elongated sill member 110 and elongated base member 130 of the thermal break device 100 are preferably fabricated of a high-density plastic or composite material that withstands ultraviolet light and is sufficiently strong enough to withstand heavy loads associated with a moving vehicle. Specifically, after the thermal break device is installed, vehicles will regularly travel on the thermal break device as they enter and exit a garage door opening of a building. As such, the thermal break device is designed to support heavy loads associated with vehicles traveling over the thermal break device on a daily basis over a long period of time.

It is to be appreciated that the elongated sill member 110 and elongated base member 130 of the thermal break device 100 can be made from various types of thermoplastics including, but not limited to, various acrylic monomers or polymers, acrylonitrile butadiene styrene (ABS), polybenzimidazole (PBI), polycarbonate, polyethersulfone (PES), polyoxymethylene (POM), polyether ether ketone (PEEK), polyetherimide (PEI), polyethylene, polypropylene, PVC, Teflon, high density poly ethylene (HDPE), or a blend of several plastics. Notably, HDPE has increased sustainability and is recyclable.

It is to be understood that thermal break device is fabricated from a material that advantageously has significant mechanical and thermal properties. For example, the thermal break device can be made from an HDPE material. The HDPE material provides increased tensile strength, scratch resistance, UV-resistance and chemical resistance. Additionally, HDPE can be easily imprinted with designs, and it is easier to clean. The HDPE material allows for the thermal break device to be easily formed with a particular color or pattern based on user preference that can withstand degradation from sunlight and mechanical damage (e.g., scratches, cracks, etc.) that might otherwise impact more conventional materials. Alternatively, it should be appreciated that the thermal break device can also be constructed of metal, aluminum, thermosetting polymers, rubber and combinations thereof.

As further discussed below, the thermal break device 100 is sized to accommodate a wide variety of garage door threshold openings. Although the thermal break device 100 is shown as having a unitary construction, it is to be appreciated that the thermal break device can be of modular construction. That is, the thermal break device can be formed with a plurality of adjacent thermal break device segments 100A-F (not shown) to adapt to the specific dimensions of an installation site. In accordance with an aspect, thermal break device segments 100A-F are configured to be coupled together end-to-end. In accordance with another aspect, the thermal break device segments may be fabricated off-site in certain designated dimensions, such as one-foot increments. Thereafter, the thermal break device can easily be cut on site with standard carpentry tools to accommodate the specific dimensions of the door opening.

As shown in FIGS. 2-5, the insulation member 200 is configured to be positioned within the pocket 195 formed by the elongated sill member 110 and the elongated base member 130. More specifically, when installed, the insulation member 200 is placed adjacent the bottom surface 122 of the elongated sill member 110 and the inner surface 132 of the elongated base member 130. In alternative embodiments, the thermal break device 100 can be coated with the insulation member 200. The insulation member 200 can also be adhesively attached to the thermal break device 100. The insulation member 200 is configured to reduce heat transmission from the concrete floor to an exterior of a building when installed. That is, thermal break device 100 and insulation member 200 are configured to provide a thermal break between an interior of a building structure and an exterior of a building structure when installed at a door opening.

The insulation member 200 can be any high density insulation material suitable for supporting the weight of a vehicle once the thermal break device 100 is installed. In one example, the insulation member may be spray foam insulation, such as a closed-cell spray foam insulation. Closed-cell spray foam insulation refers to spray foam that is composed of cells that are completely encapsulated and tightly pressed together. Advantageously, the closed-cell structure of closed-cell insulation material reduces the absorption and migration of moisture from adjacent areas to ensure that, for example, water is not absorbed from concrete as it is being poured during installation of the thermal break device. Due partially to its extremely high density, closed-cell spray foam insulation has one of the highest R-values of any insulation material available in the industry. The R-value identifies how effective a particular insulation material is at preventing the flow of heat into and out of a building. The higher the R-value, the greater the insulation performance.

The R-value of insulation material typically will vary based on the type, thickness and density of the insulation material. As discussed throughout the present disclosure, insulation materials with higher R-values are especially advantageous and required by building codes in colder climates where residential and commercial buildings often suffer from energy inefficiency due to heat loss. For example, in the present disclosure, when properly installed, the closed-cell spray foam insulation can have an R-value of around 6.5-7 per inch.

It is to be appreciated that most residential and commercial buildings are built according to standardized building practices, e.g., uniform building codes. For example, buildings that contain metal, concrete and a combination of concrete and metal require a certain level of insulation due to the relatively high thermal conductance of metal and concrete. Further to this, state energy and building codes regarding insulation and energy savings are often guided by model codes such as the IECC and others referenced above. These requirements often consist of specific R-value requirements for insulation in building construction based on the geographic region. As a result, it is to be understood that the R-value for the insulation member 200 can be adjustable for the door threshold system so long as the insulation member 200 meets or can be adapted to meet the configuration of the present disclosure and any applicable construction regulations.

As discussed above, building code regulations often vary by climate zone. For example, building code regulations in New Hampshire's State Building Code Review Board (See https://www.nh.gov/safety/boardsandcommissions/bldg-code/) are governed by climate zones 5 and 6 and require that insulation for residential and commercial buildings correspond to a specific R-value. In accordance with an aspect, the R-value of the door threshold system 10 is preferably between about 12 and about 17. In one example, the R-value of the door threshold system 10 is 13.

As shown in FIG. 2, the garage door threshold system 10 includes a second insulation member 220 that is formed as a rigid insulation material positioned adjacent a portion of the outer surface 134 of the elongated base member 130. For purposes of clarity, insulation member 200 is also referred to as first insulation member 200. As shown in FIG. 2, the second insulation member 220 also extends deeper into the ground and adjacent the concrete foundation 284 to reduce heat transmission from the foundation to an exterior of the building. That is, the second insulation member 220 is disposed vertically against the concrete foundation 284. In accordance with an aspect, the second insulation member 220 can also be fixedly attached to an exterior surface of the concrete foundation 284. For example, any securing methods or means are suitable for attaching the second insulation member to the concrete foundation, such as tacks, screws, adhesives, tape, snap-fit, tab and groove, or any combination thereof.

The second insulation member 220 can be a rigid foam strip or a rigid foam material including, but not limited to polyisocyanurates polyurethanes, extruded polystyrene, expanded polystyrene, tannic foams, phenolic foams, bio-phenolics foams, and combinations thereof.

Referring now to FIG. 2, the garage door threshold system 10 further includes at least one fastener 245 that is configured to secure the thermal break device 100 to a form board 240 adjacent the second insulation member 220. Before pouring concrete for a concrete foundation slab or a concrete floor, a form board i.e., form board 240, is used to build a retaining wall to ensure that concrete is properly poured. The form board also facilitates the leveling of concrete after it is poured. Once a concrete floor or foundation is poured, the form board can then subsequently be removed after the concrete has cured.

In the present disclosure, the at least one fastener 245 is configured to secure the thermal break device 100 to the form board 240. Specifically, fastener 245 secures the elongated base member 130 to form board 240. Although the form board 240 is shown adjacent the outer surface 134 of the elongated base member 130, it is to be understood that the fastener 245 can secure the thermal break device 100 to a wood board (not shown) placed in the concrete foundation 284 near a door opening. In that scenario, the fastener 245 can extend through thermal break device 100 and into the wood board in the concrete foundation. It is to be appreciated that any type of fastener suitable for its intended purpose of securing the thermal break device 100 to form board 240 can be used.

It is appreciated that secondary fasteners may also be used to further secure the thermal break device 100 in position. For example, in accordance with another aspect, the door threshold system 10 can further include a pair of secondary fasteners (not shown) to secure the elongated base member 130 directly to the concrete foundation 284. The secondary fasteners can be any type of fasteners such as metal screws, self-threading screws, bolts, rivets, etc. with or without washers for additional support.

Referring now to FIGS. 2-4, the thermal break device 100 further includes a plurality of studs 190 that extend from the bottom surface 122 of the elongated sill member 110. Prior to pouring a concrete floor on the foundation 284, there is a gap 280 formed between the bottom surface 122 of the elongated sill member 110 and the foundation 284. The gap 280 provides a pathway for the plurality of studs 190 extending from the elongated sill member 110 in the vertical direction 121 that is perpendicular to the longitudinal direction 111 and the transverse direction 117. As discussed below, the thermal break device 100 is secured in place prior to pouring the concrete floor such that the plurality of studs 190 extend into the gap 280. Thereafter, the plurality of studs 190 serve to secure the thermal break device 100 in place once the concrete is poured into the gap and the concrete cures. Specifically, the concrete is "site-cast" or "cast-in-place" concrete that is poured and cured onsite in the concrete's finished position. As such, when the cast-in-place concrete is poured around the installed thermal break device, the thermal break device becomes embedded in the cured cast-in-place concrete via the plurality of studs 190.

In operation, an installer or builder may initially determine the required length for the garage door threshold system by measuring the length of the door opening. The thermal break device is then cut to a desired length based on the length of the door opening. Thereafter, insulation material such as closed-cell spray foam insulation is installed into the concrete opening leaving a gap of approximately 2 inches to accommodate the elongated sill of the thermal break device. Subsequently, the thermal break device 100 is positioned in the opening so it is in contact with the slab 284 and/or floor 185. The thermal break device 100 can be fixedly attached to insulation material at a desired height or position. Additionally, fasteners are used to secure the thermal break device to a form board adjacent an outer surface of the elongated base member. The form board also serves as a retaining wall to ensure that concrete is properly poured. It is to be understood that the thermal break device can optionally be further secured to the foundation 284 and/or floor 185. Thereafter, the concrete (i.e., cast-in-place concrete) is poured into the gap between the foundation and the elongated sill member. As a result, the plurality of studs extending from the bottom surface of the elongated sill member are embedded into the concrete floor once cured. That is, the plurality of studs facilitates securing the thermal break device in place once the concrete floor is cured. The form board can then be subsequently removed. It is to be understood that the thermal break device is configured for use with the construction of new residential, commercial, or industrial buildings. For example, the thermal break device could be used with any building that suffers from heat loss through slab openings including, but not limited to, residential, commercial, industrial, municipal or any other mixed-use building.

Embodiments of the present disclosure will now be further described with respect to exemplary methods that utilize the garage door threshold system and the thermal break device described herein. For example, the garage door threshold system may be used in a particular method for insulating a door opening. One of the first steps in building a residential or commercial structure is pouring a foundation, e.g., a concrete slab foundation. As the concrete slab for the intended building structure is poured, the slab may include other devices to enhance strength, such as reinforcement bars. It is to be understood that wire mesh and/or additional steel reinforcing bars may be implanted in the concrete slab for additional structural integrity. As part of this process, a driveway surface is formed such that it is aligned with the door opening, such as a garage door opening of the building structure. When the driveway surface and concrete slab are formed, there is a break, i.e., opening, between the driveway surface and the concrete slab for positioning the thermal break device therein.

Specifically, the method includes installing insulation material in an opening in concrete aligned with the door opening. The method also includes placing a thermal break device into the opening so that an elongated sill of the thermal break device is aligned with an exterior surface near or adjacent to the door opening. The method also includes securing the thermal break device in place in the opening. The method further includes pouring concrete into the opening to secure the thermal break device in alignment with the door opening.

The method may further include, after securing the thermal break device in place in the opening, securing the thermal break device to a foundation in the opening. The thermal break device is secured to a form board adjacent a second insulation material via a plurality of fasteners. The method may further include, before placing a thermal break device into the opening, cutting the thermal break device to correspond to a measured length of the door opening. The method may further include, wherein pouring concrete into the opening causes a plurality of studs extending from a bottom surface of the elongated sill to be embedded into the concrete.

Another general example may include a method of installing a threshold system for insulating a door opening. The method includes cutting a thermal break device to a length of the door opening. The method further includes installing insulation material in an opening in concrete aligned with the door opening. The method further includes securing the thermal break device to a form board adjacent a second insulation material so that an elongated sill of the thermal break device is aligned with an exterior surface adjacent the door opening. The method may further include pouring concrete into the opening to fix the thermal break device in alignment with the door opening.

Implementations may include one of the following features or steps. The method may include, wherein pouring concrete into the opening causes a plurality of studs extending from a bottom surface of the elongated sill to be embedded into the cast-in-place concrete.

While the exemplary embodiments discussed above illustrate the thermal break device 100 as installed within a garage door threshold opening, it is to be understood that the thermal break device can also be installed in a doorway opening to provide a thermal break. It is to be understood that the thermal break device as described throughout the present disclosure can be used for insulating thresholds of door openings of any size and in any structure. For example, the thermal break device may also be used on trailers, sheds, delivery trucks, industrial doors, animal enclosures, metal buildings, campers, boats, ice shanties, or any other structure having an opening where insulation may be necessary.

Figure 6:
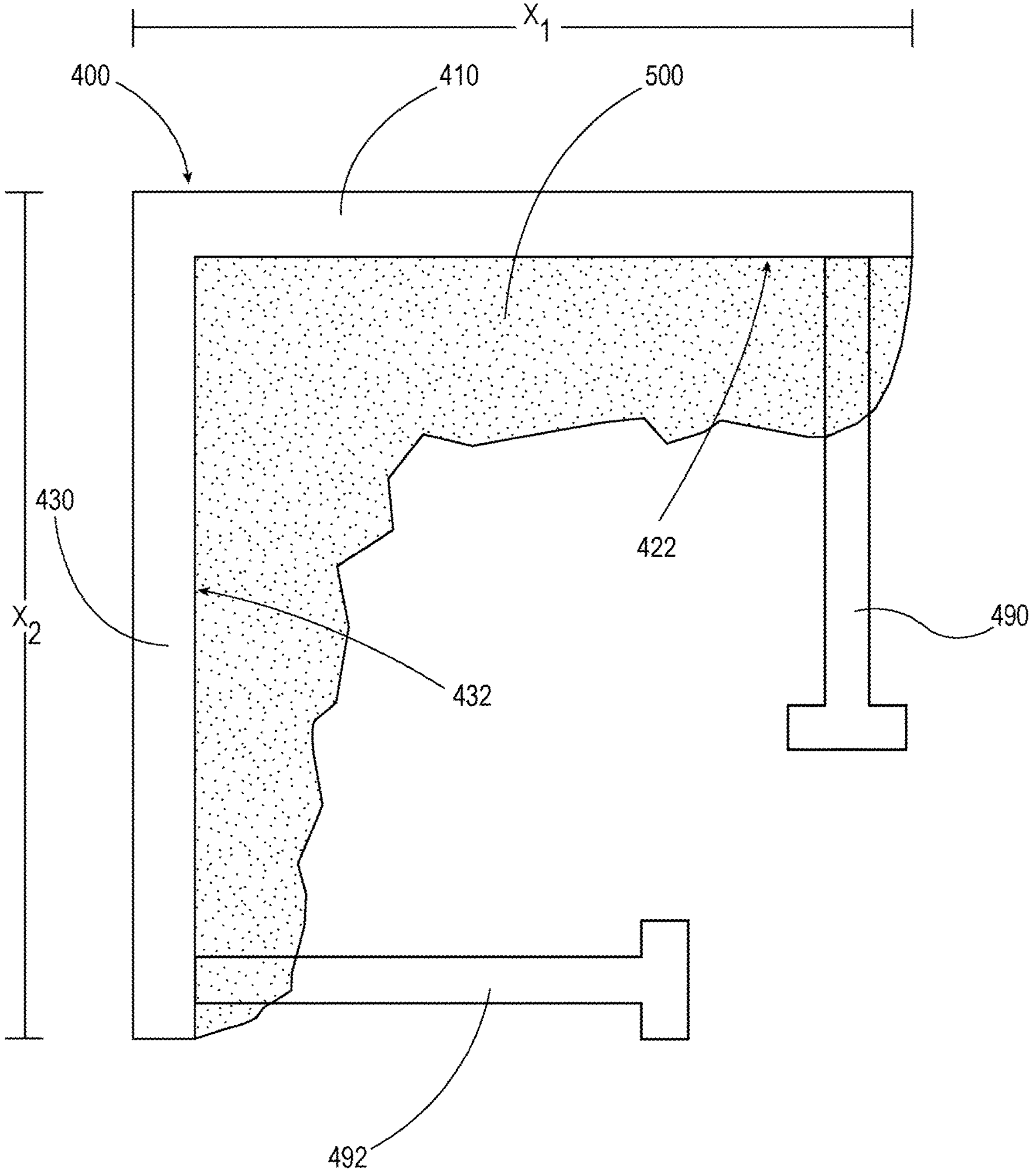
FIG. 6 is a simplified side plan view of a thermal break device in accordance with another exemplary embodiment of the present disclosure.

Referring now to FIG. 6, in accordance with another exemplary embodiment of the present disclosure, there is shown a thermal break device 400 configured to provide a thermal break for a doorway opening. The thermal break device 400 is similar to thermal break device 100 except as specifically described herein. That is, thermal break device 400 includes an elongated sill member 410 and an elongated base member 430 extending from the elongated sill member. In accordance with an aspect, an insulation member 500 is configured to be positioned adjacent at least one of a bottom surface 422 of the elongated sill member 410 and an inner surface 432 of the elongated base member 430. It is to be appreciated that insulation member 500 is similar to insulation member 200. That is, insulation member 500 is configured as a spray foam insulation, such as a closed-cell spray foam insulation. In accordance with an aspect, insulation member 500 is a closed-cell spray foam insulation having an R-value between about 6 and about 7. It is to be appreciated that the R-value for the insulation member 500 can be adjustable so long as the insulation member 500 meets or can be adapted to meet the configuration of the present disclosure and any applicable construction regulations.

As shown in FIG. 6, the thermal break device 400 includes a first plurality of studs 490 that extend from the bottom surface 422 of the elongated sill member 410. The thermal break device 400 includes a second plurality of studs 492 that extend in the interior direction P from inner surface 432 of the elongated base member 430. Similar to the plurality of studs 190 discussed above, the first and second plurality of studs 490, 492 help to secure the thermal break device 400 in place when installed in a doorway opening. That is, once a concrete floor is cured, the first and second plurality of studs 490, 492 serve to secure the thermal break device 400 in place. For ease of reference, only one of the first plurality of studs 490 and only one of the second plurality of studs 492 is shown in FIG. 6. However, it is to be understood that the present disclosure includes multiple studs 490, 492.

As shown in FIG. 6, the elongated sill member 410 has a length $X_1$ between about 5 inches and about 6 inches. In one example, the length $X_1$ of the elongated sill member 410 is about 5½ inches. The elongated base member 430 has a length $X_2$ between about 7 inches and about 9 inches. In one example, the length $X_2$ of the elongated base member 430 is about 8 inches. It should be appreciated that the thermal break device 400 may be manufactured in a variety of dimensions to accommodate a wide variety of doorway openings. Where necessary, the thermal break device 400 may be trimmed using a saw, shears or other cutting means to accommodate the specific dimensions of the doorway opening.

Wherever possible, the same or like reference numbers are used throughout the drawings to refer to the same or like features. It should be noted that the drawings are in simplified schematic form and are not drawn to precise scale. Certain terminology is used in the description is for convenience only and is not limiting. Directional terms such as top, bottom, left, right, above, below and diagonal, are used with respect to the accompanying drawings. The words "inwardly" and "outwardly" refer to directions toward and away from, respectively, the geometric center of the identified element and designated parts thereof. Such directional terms used in conjunction with the following description of the drawings should not be construed to limit the scope of the present disclosure in any manner not explicitly set forth. Additionally, the term "a," as used in the specification, means "at least one." The terminology includes the words above specifically mentioned, derivatives thereof, and words of similar import.

"Substantially" as used herein shall mean considerable in extent, largely but not wholly that which is specified, or an appropriate variation therefrom as is acceptable within the field of art. "Exemplary" as used herein shall mean serving as an example.

Furthermore, the described features, advantages and characteristics of exemplary embodiments may be combined in any suitable manner in one or more embodiments. One skilled in the art will recognize, in light of the description herein, that the exemplary embodiments can be practiced without one or more of the specific features or advantages of a particular embodiment. In other instances, additional features and advantages may be recognized in certain embodiments that may not be present in all embodiments of the present disclosure.

While the disclosure is described herein, using a limited number of embodiments, these specific embodiments are not intended to limit the scope of the disclosure as otherwise described and claimed herein. The precise arrangement of various elements and order of the steps of articles and methods described herein are not to be considered limiting. As such, the method can be implemented in any order as desired.

The invention claimed is:

1. A threshold system, comprising:

a thermal break device having an elongated sill member including a leading end, a trailing end opposite the leading end along a longitudinal direction, opposed side ends spaced apart along a transverse direction that is perpendicular to the longitudinal direction, a bottom surface, and an upper surface opposite the bottom surface;

an elongated base member that extends from and is substantially perpendicular to the elongated sill member in a vertical direction that is perpendicular to the longitudinal direction and the transverse direction, the elongated base member including an inner surface and an outer surface opposite the inner surface;

a first plurality of studs, wherein an entire length of the first plurality of studs extends from the bottom surface of the elongated sill member substantially parallel to the vertical direction; and a second plurality of studs, wherein an entire length of the second plurality of studs extends from the inner surface of the elongated base member substantially parallel to the longitudinal direction.

2. The threshold system of claim 1, further comprising an insulation member configured to be positioned adjacent to at least one of the bottom surface of the elongated sill member and the inner surface of the elongated base member.

3. The threshold system of claim 2, wherein the bottom surface of the elongated sill member and the elongated base member form a rectangular shaped receiving pocket sized to receive the insulation member therein.

4. The threshold system of claim 2, wherein the insulation member is foam.

5. The threshold system of claim 1, wherein the elongated base member defines a lower terminal end spaced apart from the upper surface of the elongated sill member along the vertical direction.

6. The threshold system of claim 1, wherein the elongated sill member has a length $X_1$ of about 4 to 7 inches and the elongated base member has a length $X_2$ of about 6 to 10 inches.

7. The threshold system of claim 6, wherein the length $X_1$ is equal to the length $X_2$.

8. The threshold system of claim 1, wherein the thermal break device is made of a plurality of thermal break device segments configured to be coupled together end-to-end.

9. The threshold system of claim 1, wherein the threshold system has an R-value between 12 and 17.

10. The threshold system of claim 1, wherein the upper surface of the elongated sill member has one or more anti-slip elements.

11. The threshold system of claim 1, wherein the elongated sill member is angled relative to the elongated base member by about 85 to 95 degrees.

12. A thermal break device for an opening of a building structure and configured to provide a thermal break between an interior of the building structure and an exterior of the building structure, the thermal break device comprising:

an elongated sill member including a leading end, a trailing end opposite the leading end along a longitudinal direction, opposed side ends spaced apart along a transverse direction that is substantially perpendicular to the longitudinal direction, a bottom surface, and an upper surface opposite the bottom surface along a vertical direction that is substantially perpendicular to the longitudinal direction and the transverse direction;

an elongated base member extending from the elongated sill member in the vertical direction that is substantially perpendicular to the longitudinal direction and the transverse direction, the elongated base member defining an inner surface, an outer surface spaced apart from the inner surface in the longitudinal direction such that the inner surface is substantially perpendicular to the trailing end of the elongated sill member, the elongated base member further defining a lower terminal end spaced apart from the elongated sill member in the vertical direction, wherein the inner surface of the elongated base member at the lower terminal end does not extend in the longitudinal direction, such that, the elongated sill member and the elongated base member define a substantially L-shaped body having a receiving pocket sized to receive insulation therein;

a first plurality of studs, wherein an entire length of the first plurality of studs extends from the bottom surface of the elongated sill member so as to be substantially parallel to the vertical direction; and a second plurality of studs, wherein an entire length of the second plurality of studs extends from the inner surface of the elongated base member so as to be substantially parallel to the longitudinal direction.

13. The thermal break device of claim 12, wherein an insulation member is configured to be positioned adjacent at least one of the bottom surface of the elongated sill member and the inner surface of the elongated base member.

14. The thermal break device of claim 13, wherein the insulation member is a first insulation member, further comprising a second insulation member positioned such that the second insulation member abuts the outer surface of the elongated base member.

15. The thermal break device of claim 13, wherein the insulation member is a closed-cell spray foam insulation having an R-value between 6 and 7.

16. The thermal break device of claim 12, wherein the upper surface of the elongated sill member has one or more anti-slip elements.

17. The thermal break device of claim 12, wherein the elongated sill member has a length $X_1$ of about 4 to 7 inches and the elongated base member has a length $X_2$ of about 6 to 10 inches.

18. The thermal break device of claim 12, wherein the elongated sill member is angled relative to the elongated base member by about 85 to 95 degrees.

19. A method, comprising:

installing insulation material in an opening in concrete aligned with a building opening;

placing a thermal break device into the opening so that an elongated sill of the thermal break device is aligned with an exterior surface near or adjacent to the building opening;

securing the thermal break device in place in the opening;

positioning the thermal break device such that an entire length of a first plurality of studs extends into the opening from a bottom surface of the elongated sill substantially parallel to an elongated base that is substantially perpendicular to the elongated sill, and an entire length of a second plurality of studs extends from an inner surface of the elongated base of the thermal break device substantially parallel to the elongated sill; and pouring concrete into the opening to secure the thermal break device in alignment with the building opening causing the first and second plurality of studs to be embedded into the concrete.

20. The method of claim 19, further comprising, after securing the thermal break device in place in the opening, securing the thermal break device to a foundation in the opening.

21. The method of claim 19, wherein the thermal break device is secured to a form board adjacent a second insulation material via a plurality of fasteners.

22. The method of claim 19, further comprising, before placing a thermal break device into the opening, cutting the thermal break device to correspond to a measured length of the building opening.

23. The method of claim 19, wherein the insulation material includes a first insulation member positioned adjacent at least one of the bottom surface of the elongated sill and the inner surface of the elongated base, and a second insulation member positioned such that the second insulation member abuts an outer surface of the elongated base.

* * * * *